H. C. FORD.
TARGET BEARING AND RANGE FINDING PERISCOPE.
APPLICATION FILED JAN. 21, 1918.

1,332,209.

Patented Mar. 2, 1920.
6 SHEETS—SHEET 1.

Inventor
Hannibal C. Ford

By his Attorney

H. C. FORD.
TARGET BEARING AND RANGE FINDING PERISCOPE.
APPLICATION FILED JAN. 21, 1918.

1,332,209.

Patented Mar. 2, 1920.
6 SHEETS—SHEET 5.

Fig. 7.

UNITED STATES PATENT OFFICE.

HANNIBAL C. FORD, OF NEW YORK, N. Y., ASSIGNOR TO FORD INSTRUMENT COMPANY, INC., A CORPORATION OF NEW YORK.

TARGET-BEARING AND RANGE-FINDING PERISCOPE.

1,332,209.

Specification of Letters Patent.  Patented Mar. 2, 1920.

Application filed January 21, 1918. Serial No. 213,058.

*To all whom it may concern:*

Be it known that I, HANNIBAL C. FORD, a citizen of the United States, residing at the city of New York, in the borough of Queens and State of New York, have invented certain new and useful Improvements in Target-Bearing and Range-Finding Periscopes, of which the following is a full, clear, and exact description.

This invention relates to a target-bearing and range-finding periscope.

One of the objects of the invention is to combine, in a single instrument, a target-bearing periscope and a range-finder, operating on the coincidence principle, whereby it is possible to obtain simultaneous readings from both of these instruments, which is essential for accurate fire control.

Another object of the invention is to provide an instrument of the character referred to, which is so constructed that the readings of both the bearing and the range may be transmitted directly from the instrument to a distant station, as, for example, where the instrument is in the conning tower of a battleship, the readings may be transmitted to the plotting-room or to a gunner's station.

More specifically stated, it is also the object of the invention to provide an improved type of range-finder operating upon the coincidence principle which utilizes a distant or remote base. In instruments of this character, as is well known, the range is determined by refracting prisms which are linearly moved within the instrument to cause points at the base and top of the target to be brought into coincidence, the amount of linear movement of the prisms determining the range, since the linear displacement is substantially inversely proportional to the range.

Accordingly, it is also an object of the invention to provide a range-finder of this character with means whereby this linear displacement of the prisms, which is inversely proportional to the range, can be rectified or converted into rotary motion, where angular displacement is directly proportional to the range. This permits the rotary member to be utilized for transmitting intelligences to a remote point.

The invention also aims to improve the optical systems employed in the range-finder which improvement specifically contemplates the provision of a plurality of rotatable prisms so arranged that their relative rotation can be utilized for bases of different heights, and also for the purpose of correctly centering the images within the instrument.

The invention further aims to provide an instrument which may be utilized in determining ranges within wide limits without unduly increasing the side of the machine by providing an additional range scale which may be used with longer bases when high ranges are to be measured.

With these and other objects in view, which will be hereinafter described in conjunction with the accompanying drawings, the invention consists of the constructions and combinations which will be hereinafter set forth and particularly pointed out in the appended claims.

Figure 1:
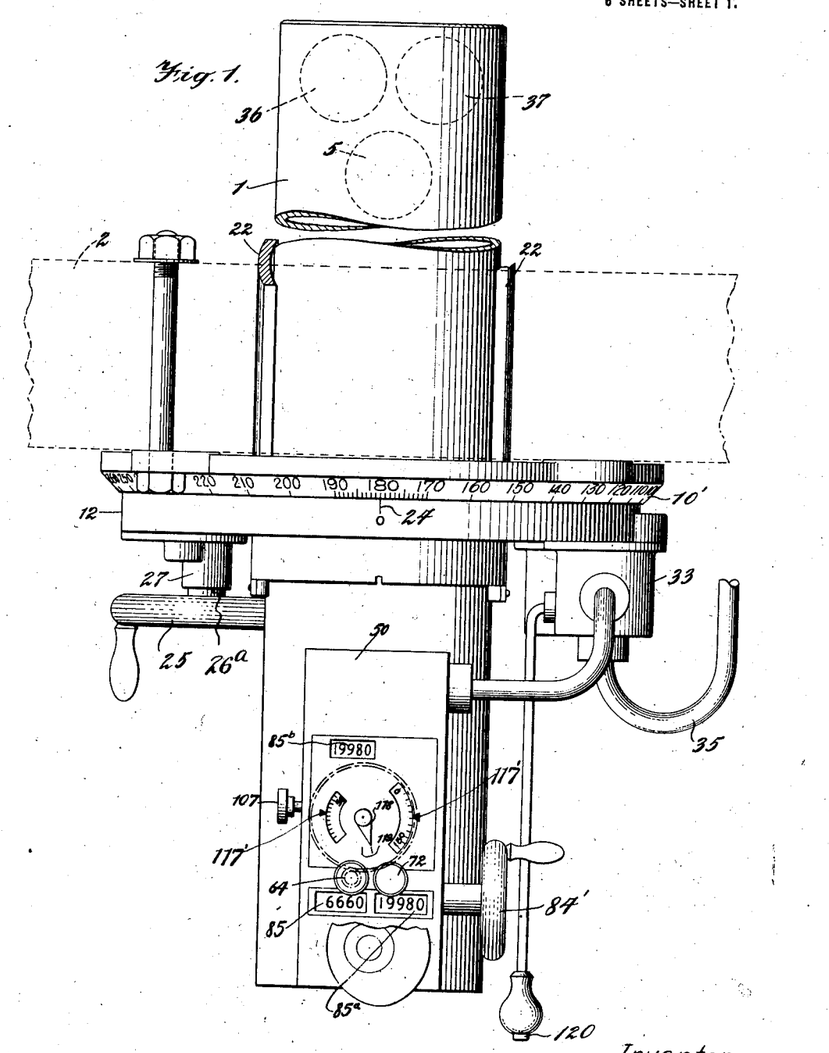
Figure 1 shows in side elevation an instrument constructed in accordance with the principles of my invention.
Figure 2:
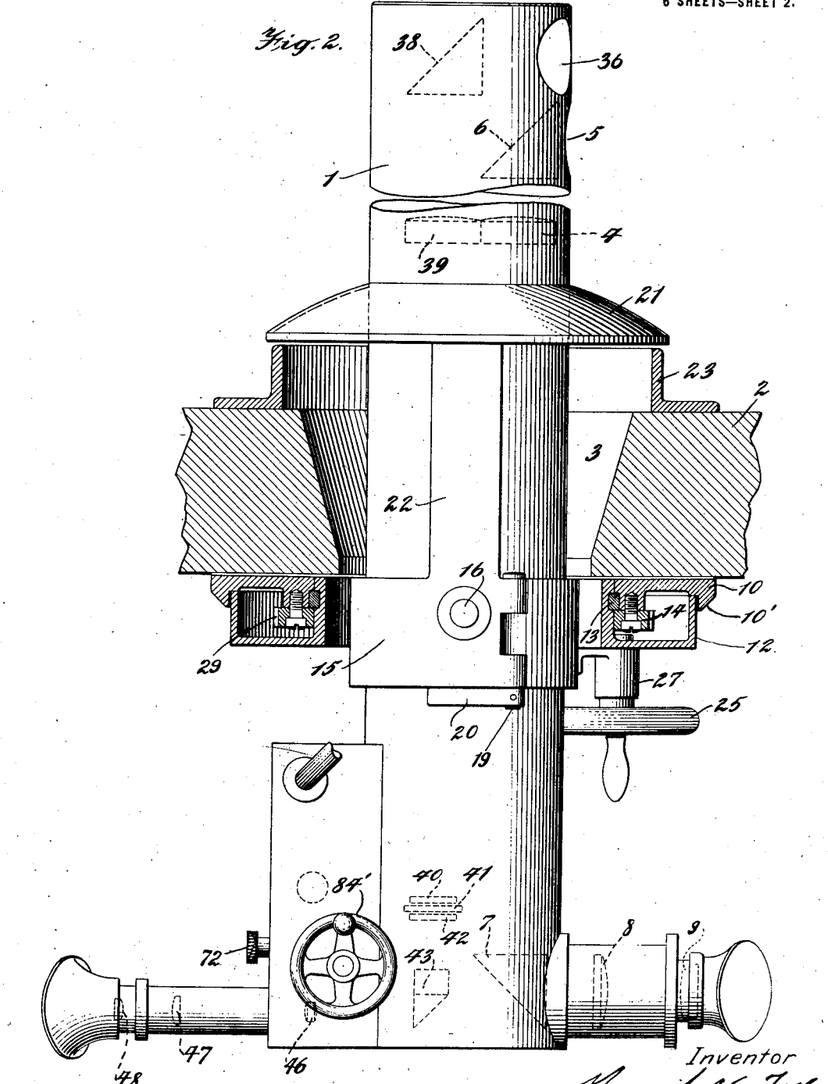
Fig. 2 is an elevation at right angles to Fig. 1, parts of the instrument being shown in sections, the figure being on a slightly reduced scale.

In the practical embodiment of the invention it is preferable to mount all of the optical parts of the instrument in a single periscope, which, as shown in Figs. 1 and 2, comprises a relatively long, straight tubular member 1, which is adapted to be supported in vertical position, the periscope passing through a suitably disposed opening 3 in a supporting plate 2. The side walls of the opening 3 are tapered, as shown, to permit the periscope to remain in vertical position should the supporting plate assume an angular position.

The target-bearing telescope comprises a single objective 4 through which the rays of light entering the periscope through a circular opening 5 are reflected by means of the reflecting prism 6. The light rays after passing through the objective being again reflected by a second prism 7 through magnifying lenses 8 to an eye piece 9 at which point the image of the target may be observed. As will be clear from Fig. 2, the system of optical parts shown is so arranged as to give an erect image of the target when viewed by an observer facing in a direction opposite from that of the target.

Figure 3:
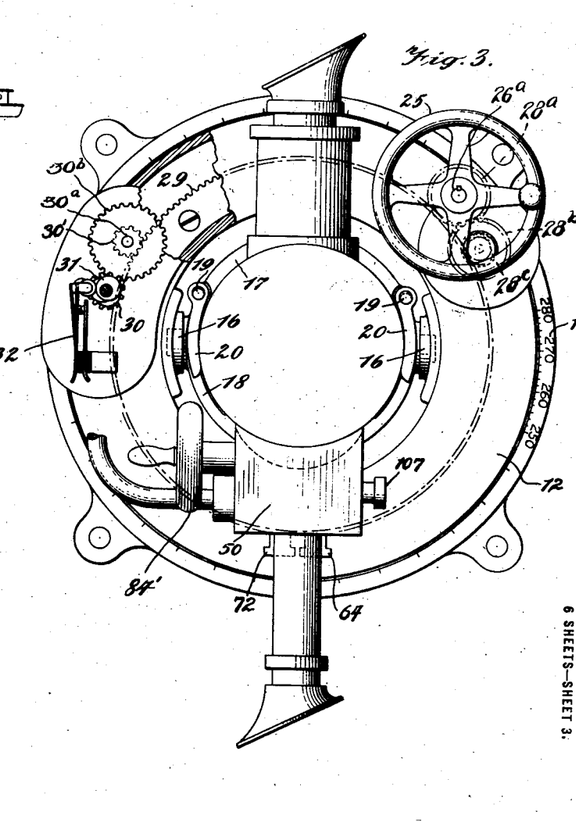
Fig. 3 is a bottom plan view of Fig. 1, but on the same scale as Fig. 2.

The periscope is mounted for rotation on its vertical axis by means under the control of the observer at the eye-piece 9 of the telescope, as will now be described. Suitably secured to the under face of the plate 2 is an annular base ring 10 having its outer surface beveled, and divided into degrees providing a scale 10'. Positioned beneath this ring is a rotatable annular ring 12 called the bearing ring, which, as shown in Fig. 2, is substantially U-shaped in cross-section. The bearing ring is secured to the base ring 10 by a split key ring 13, which fits into grooves cut in the other two rings, and is held in place by a removable retaining ring 14 carried by the bearing ring. A cradle 15 which is adapted to embrace the periscope is mounted on the bearing ring 12 by means of trunnion bearings 16 (see Fig. 3). In order to rigidly hold the periscope against longitudinal displacements and yet permit its ready removal when necessary, the cradle comprises two segments 17 and 18, respectively, which are joined together as at 19, by eccentric pivot pins to which are secured thumb levers 20. When the levers 20 are moved outwardly the internal diameter of the cradle increases, which permits the removal of the periscope, but when these levers are pressed inwardly the cradle rigidly clamps the periscope in position. To protect the parts of the instrument from rain or moisture which would otherwise enter it through the opening 3 in the plate 2, an umbrella 21 is provided which is carried by upright arms 22 extending from the cradle. The lower edge of the umbrella is adjacent to and fits over the upper edge of an upright circular flange 23 surrounding the opening 3. The outer peripheral surface of the bearing ring is provided with a marker or pointer 24, which is adapted to register with the scale 10' on the base ring.

The bearing ring 12 is rotated by means of a hand wheel 25 secured to a shaft 26ª passing through a suitable bearing formed in a boss 27, projecting downwardly from the under surface of the bearing ring. The shaft 26ª is connected by gears 28ª, 28ᵇ and 28ᶜ to a circular rack 29 formed upon the outer peripheral surface of the retaining ring 14. It will therefore be seen that by rotating the hand wheel 25 the telescope may be brought to bear upon any desired target and the bearing read directly from the scale 10' by means of the pointer 24.

In order to electrically transmit the bearing to a distant point, as, for example, to a gunner's station, a gear 30' on a shaft 30ª engaging the rack 29. The shaft 30ª carries a gear 30ᵇ which drives a gear 30 mounted upon a shaft carrying a series of rotary cams 31 which actuate the transmitter switch contacts 32 mounted within a box or casing 33 shown in Fig. 1. These rotary switches are so arranged that for uniform changes in the angular position of the telescope a uniform number of electrical impulses will be transmitted. The wires connected to the switches pass through cable 35, and are adapted to be connected at their other end to any suitable type of step-by-step motor which actuates an azimuth indicator at the distant station.

In the type of instrument shown, the range from the point of observation to the target is determined by the measurement of the angle at the instrument which is subtended by the vertical base at the target. To measure this angle refracting prisms are mounted in the instrument, which refracting prisms bend the light rays passing therethrough so that the light rays passing through the extremities of a given vertical base are brought into coincidence. When the rays are once brought into coincidence in the instrument, the translatory movement necessary to maintain them so, upon changes in the range, is proportional to the angle subtended, or is substantially inversely proportional to the range. This method of determining range is well known and is generally recognized as the coincidence principle.

Figure 4:
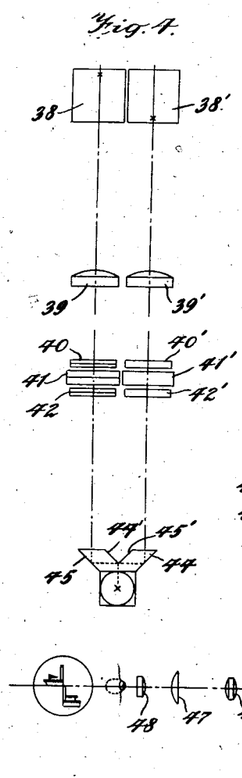
Figs. 4 and 5 are diagrammatic views of the optical parts of the range finder.

In the preferred form of the instrument, to enable the light rays to be brought into coincidence, two separate optical systems are employed, each of which is designed to project the two light rays from the extremities of the vertical base, and for this purpose the periscope is provided with two openings 36 and 37 through which two sets of light rays from the extremities of the vertical base enter the instrument. The light rays entering through these two openings are deflected downwardly through the periscope by reflecting prisms 38 and 38', and pass through corresponding objectives 39 and 39'. Each group of rays then passes through a set of refracting prisms, each set comprising three prisms, the prisms of one set being designated 40, 41 and 42 and those of the other set 40', 41' and 42', respectively (see Fig. 4).

Figure 5:
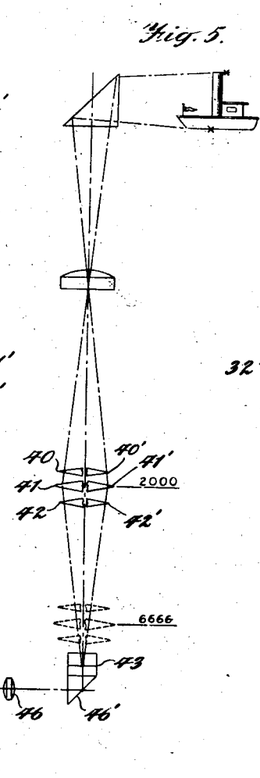

To adapt the instrument for use with different base heights, two of the prisms of each set, namely, 40 and 42 and 40' and 42', respectively, are each cut so that the effective angle through which the rays are refracted by passing therethrough is the same, which refracting angle will be for convenience designated as $a$. As will be hereinafter described the prisms of each set are co-axially mounted and the prisms 40 and 42 are adapted to be rotated in opposite directions through an angle of 180° from their initial position. In this manner, the effective refracting angle of the combined prisms may be made to vary from a given value of $+2a$, through a point where they neutralize each other to an angle of an equal value $-2a$. This variation in the effective refracting angle also takes place in a given fixed plane which includes the axis of rotation of the prisms. The intermediate prism 41 is not adapted to be rotated during the selection of a base height and is adapted to refract a light ray through an angle equal to the angle through which the light ray is refracted by the other two movable prisms 40 and 42; or in other words, through an angle $2a$. By the co-axial arrangement of these three prisms in a set a light ray may therefore be refracted through an angle which varies from zero to a maximum of $4a$. The prisms of the other set, namely, 40', 41' and 42', are of the same construction, but as is clear from Fig. 5, the prisms of this set are arranged so that the edges point in the opposite direction, the result of which is that the image is deflected by one set of prisms in a primary vertical plane upwardly, while the image of the other set is deflected in the same plane downwardly by an equal amount. In order to keep the center line of the field of vision upon the center line of the instrument the prisms 40 and 42 are rotated in opposite directions through equal angles, and likewise the prisms 40' and 42'. The prisms 40 and 40' are also rotated in opposite directions as are also prisms 42 and 42'.

If the range is known, the prisms are first given a translatory movement to a position corresponding to that range and then the prisms 40, 42 and 40' and 42' are rotated, as described, to change the effective refracting angle of the prisms so that the light rays from the extremities of the selected vertical base will appear to be in coincidence in the instrument, after which upon variations in the range a translatory movement is given to the prisms to maintain them in coincidence; the translatory movement is inversely proportional to the range and furnishes a means whereby the range may be determined.

As stated, it is necessary that the images be brought into position to be viewed by the observer so that the coincidence of the extremities of the images may be properly observed. This is accomplished by means of a reflecting rhombus 43. The light rays then pass through an erecting lens 46, through an objective 47 and through an eyepiece 48, at which point the images may be observed. The rhombus 43 is utilized in order to halve the images and is of a construction generally used for this purpose, the rhombus having two faces 44 and 45, one half of each surface of which is silvered to reflect the light rays, while the other half remains clear and permits the light rays to be transmitted therethrough. The upper half of each of these surfaces is the part which reflects the light rays and these rays are then again reflected by the surfaces 44' and 45' onto a reflecting prism 46', which forms a part of the rhombus, and then through the erecting lens, as described. The result of the use of a rhombus of this character is that the image is halved, as is shown to the left of the lower end of Fig. 5, which insures that the observer will be able to determine when the light rays passing through the extremities of the vertical base are in coincidence. In order to have the two half images abut against the same vertical line known as the halving line, the rotatable prisms 41 and 41' are employed for if these two prisms be simultaneously given a slight rotary movement in opposite direction, they will each deflect the light rays passing therethrough in a plane perpendicular to the principal or vertical plane of deflection and thus bring the two images closer or farther from the halving line. It is never necessary to rotate these prisms more than through a slight angular distance so that the effect of the rotation upon the refraction of the rays in a primary plane, that is, upwardly or downwardly along a vertical line, is negligible, whereas the deflection in the transverse or halving plane is relatively large. This is due to the law that the deflection in the primary vertical plane varies as a cosine of the angular movement of the prisms, whereas the movement in a transverse plane varies as the sine of the angle through which the prisms are rotated. It may be here noted that by making the prisms 40, 42 and 40', 42' of each set simultaneously rotatable in opposite directions with respect to each other, and also by making the prisms 40 and 42 of one set simultaneously rotatable in opposite directions to the corresponding prisms 40' and 42' of the other set, the deflection of the image in a transverse plane, which would otherwise occur and throw it from the center line of vision of the instrument, is prevented, since the resultant effect of the deflection of the rays in the plane transverse to the primary plane is thereby substantially balanced.

The sets of prisms 40, 41, 42 and 40', 41' and 42', are axially arranged in a carrier comprising two outer plates 51 and 52, and intermediate plates 53, the plates being maintained in spaced relation to each other by the pins 54 which also serve to unite the plates. These plates are shaped somewhat similar to spectacle frames and have suitable circular openings therein which receive the mounts for the refracting lenses. Annular gear wheels 55, 56 and 57, and 55', 56' and 57' constitute the mounts for the refracting prisms 40, 41 and 42, and 40', 41' and 42', respectively. The teeth of the gear wheels 55 and 57 are made of unequal widths, those of 57 being materially wider than those of 57', and the teeth of 55 and 55', and 57 and 57' are in mesh with each other. To rotate these gear wheels a single pinion 58 is employed which is of a width to engage only the gears 55' and 57.

It will therefore be seen that when this pinion 58 is rotated it will rotate the gear wheels 55' and 57 in opposite directions and these gear wheels will in turn rotate the gear wheels 55 and 57', respectively, in opposite directions as has been described. The pinion 58 is keyed to, but slidably mounted upon, a vertical shaft or spindle 59, one end of which is journaled in the prism carrier, while the other end is journaled in a suitable bearing carried by a bracket 60 mounted within the periscope adjacent its lower end. This bracket also supports the rhombus 43. The spindle 59 carries a worm-wheel 61 which meshes with a worm 62 carried by a spindle or shaft 63 disposed at right angles to the shaft 59, and which extends laterally through the casing 50 to the exterior thereof, where it is provided with a milled head 64 by which it may be manually rotated. This construction provides for the rotation of the prisms 40, 42, 40' and 42', respectively, to vary the refracting power of the same, so that the power of the prisms may be adjusted for a base of a suitable height.

A slight rotary movement is imparted to the prisms 41 and 41' by means of the gears 56 and 56' which mesh with a slidable pinion 67 mounted in the prism carrier upon a spindle or shaft 68 arranged parallel to, but to the rear of, the shaft 59. This shaft similar to shaft 59 is suitably supported at its lower end in a bearing carried by the brackets 60 at which point it carries a worm wheel 69 which meshes with a worm 70 carried by a spindle or shaft 71 arranged parallel to and in horizontal alinement with the spindle 63, which shaft also extends laterally through the casing 50 to the exterior thereof and is provided with a milled or knurled head 72 whereby prisms 41 and 41' may be simultaneously rotated in opposite directions as is necessary to bring half images into coincidence with the halving line.

Figure 6:
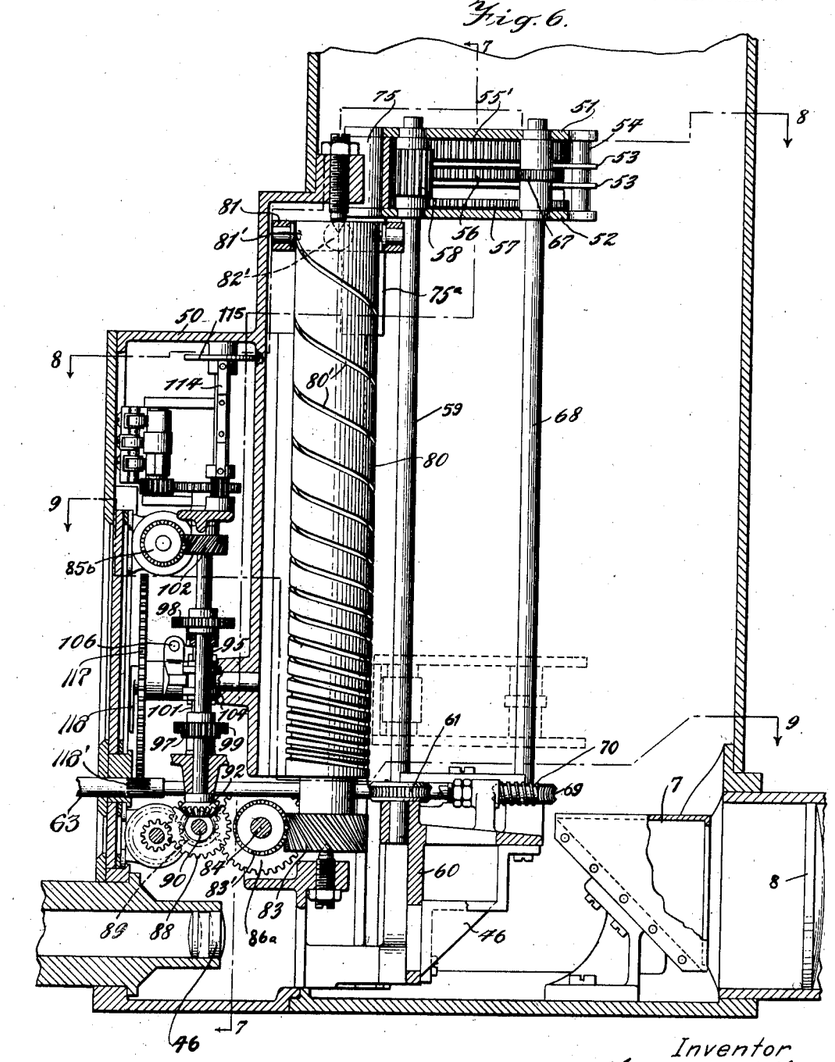
Fig. 6 is an enlarged view of the mechanism for operating the refracting prisms of the finder and the mechanisms associated therewith for indicating the range, the view being a vertical section through this mechanism, substantially on the line 6—6, as shown in Fig. 8.
Figure 7:
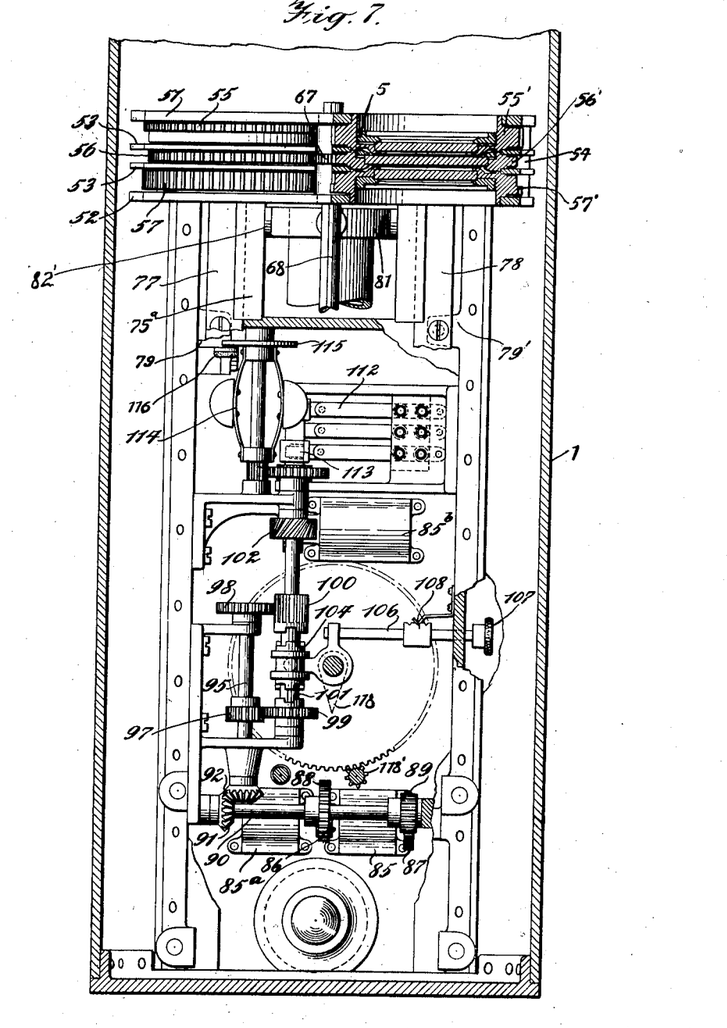
Fig. 7 is a similar view to Fig. 6, taken at right angles, as shown by the line 7—7 of Fig. 6.
Figure 8:
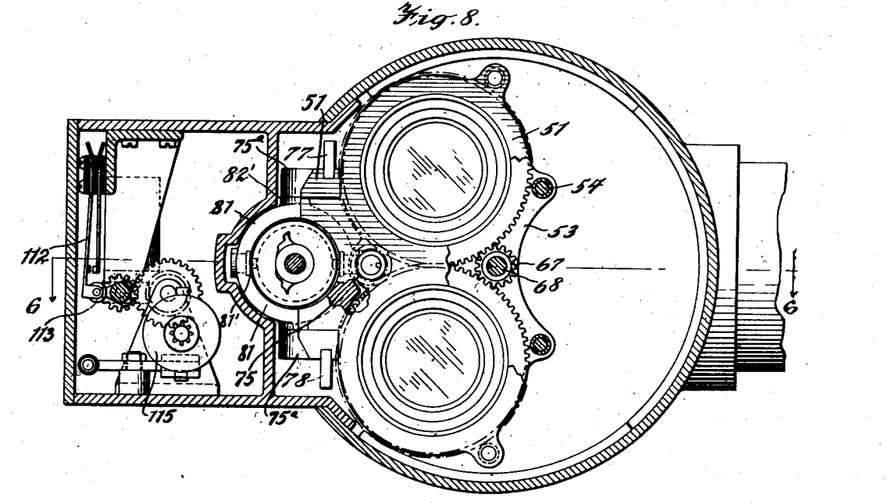
Figs. 8 and 9 are horizontal sections through Fig. 6, on the lines 8—8 and 9—9, respectively.
Figure 9:
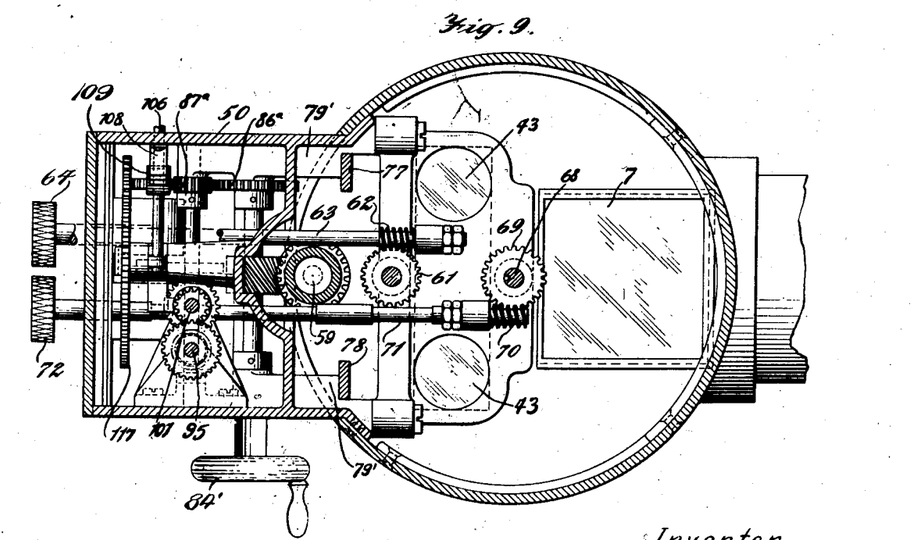

The prism carrier is supported within the periscope upon a somewhat U-shaped block 75 to which the plates 51 and 52 and 53 of the carrier are secured. The block has also two downwardly extending arms 75$^a$. This block, as will be later described, is adapted to be moved upwardly and downwardly in the periscope, it being guided by slideways 77 and 78 supported from bosses 79' on the wall 79 of the casing 50, the slideways fitting into suitable vertical grooves formed in the outer faces of the saddle-block and its arms 75$^a$. The carrier is also supported during its linear movement by the spindles 59 and 68, upon which the pinions 58 and 67 slide, these pinions being mounted for rotation within the carrier and being keyed to the spindles in such a manner as to rotate therewith, but to permit them to slide along it. A vertically disposed solid cylinder 80 which is mounted upon pivot bearings at each end is provided with a spiral cam track 80' through which linear movement is imparted to the prism carrier by means of a ring 81 carrying pins 81' which ride in the cam track 80'. The ring 81 is connected to the arms 75$^a$ of the saddle block 75 by means of trunnion bearings 82'. It will therefore be seen that when a rotary movement is imparted to the cylindrical member carrying the spiral cam track, the prism carrier will be moved vertically within the periscope. As will be clear from Fig. 6, the pitch of the spiral cam track 80' varies, the turns being the greatest distance apart at the upper end of the cylinder member, the distance between the turns decreasing until at the lower end they are relatively close together. In other words, the cam track is cut to conform to a reciprocal curve. When, therefore, the cam cylinder is rotated so that the extent of angular movement is directly proportional to the range, the prisms will have imparted to them a translatory movement which is inversely proportional to the range which is in substantial accordance with the laws relating to the movement of the prisms as have been previously described. The cam cylinder or its equivalent is therefore an important feature of the invention for the reason that the angular movement of the cam cylinder may therefore be used to drive revolution counters or similar devices to give a direct reading of the range, or if desired to drive an electrical transmitter which may be connected to a suitable receiving device at a distant station which will also give a direct reading of the range.

Rotary movement is imparted to the cam cylinder 80 by means of the spiral gears 83 and 83', the spiral gear 83' being carried by a shaft 84 which projects laterally from the casing 50 and is provided at its outer end with a hand-wheel 84' in a position to be manipulated by the observer at the eyepiece 49 of the range finder.

The instrument is also adapted to indicate ranges which extend over widely separated limits and this is preferably done by utilizing two sets of indicating mechanisms for giving direct readings of the range. These mechanisms are operatively connected to the cam cylinder in such a manner that the movable member of the indicating mechanisms which coöperates with the scale to give the range, are driven at velocities which bear a definite ratio to each other, as for example, 3 to 1 ratio, although other ratios may be employed as will be clear from the following explanation in which one specific embodiment of the instrument shown will be described. In this embodiment the cam cylinder 76 which carries the spiral reciprocal cam track 77 is of a length which is suitable for imparting to the prisms a movement which will correspond, say, to ranges between the limits of 2,000 to 6666 yds. for a given base height of not more than 50 ft. In other words, the prisms 40, 42 and 40' and 42' are chosen so that the refracting power is such that for ranges within the limits defined, a base height should be selected of not more than 50 ft. in length, which base height at a range within these limits will determine the range with sufficient accuracy. With prisms of this refracting power and a base height of not more than 50 ft. for ranges greater than 6666 yds., the difference in the position of the prisms for variations in ranges will be so slight as to make it difficult, if not impossible, to obtain a correct determination of the range, since as has been described, when the range increases, the linear movement of the prisms decreases. To therefore indicate ranges above 6666 yds. up to ranges of say 20,000 yds. a different base height should be selected which is greater than the base height selected for the lower ranges. To explain how this can be accomplished, let us assume that the range finder is utilizing a base height of 50 ft. and that the range is 6,000 yds. and that the range is rapidly and constantly increasing. If the range increases say to 8,000 yds. the slight difference in the position of the prisms will make it difcult to accurately cut the cam groove so that a correct reading will be given. Suppose, however, that instead of a base height of 50 ft. being selected at the target, a base height say, for example, of three times the size is selected, namely, 150 ft. in length, and the prisms are given a translatory movement to bring the light rays from the longer base into coincidence, it will be evident that the ratio between the distance through which the prisms must be used with a base height of this size, is proportional to the ratio between the two base heights. In other words, with a base height of three times the size only one-third as much linear movement is necessary to bring the light rays into coincidence. Therefore, if the increment is set at a given range upon a base height of say 50 ft. and the prisms are moved to a position corresponding to one-third of the actual range indicated for a short base height of the length selected, and then a base height of three times the size is selected, the light rays from the extremities of the longer base height will also be brought into coincidence. By utilizing this theory in connection with the suitable indicating mechanism, it is possible by selecting with the greater ranges a longer base height to use the same size instrument to indicate ranges between the wide limits and the indicating mechanism which is utilized in connection therewith, will now be described. It may here be stated that 3 to 1 ratio given as an example is merely chosen for convenience and any other ratio between the base heights to be selected may be selected and the indicating mechanisms constructed accordingly. It is also obvious that the two base heights selected need not necessarily be exactly in a 3 to 1 ratio for by setting the prisms at one-third of the actual range indicated on the small base height, any base height at the target may be selected of a greater length than 50 ft. and the prisms rotated as before described to bring the light rays from the extremities of the base into coincidence. In other words, if a certain height of any given length within the refracting power be selected when the prisms occupy a position corresponding to one-third of the position which they would occupy to indicate a range on a smaller base height, the movement thereafter of the prisms will be in the 3 to 1 ratio described.

The specific indicating mechanism forming a part of the embodiment of the invention illustrated will now be described. The shaft 84 which actuates the cam 80 and which may be rotated uniformly to produce a variable linear movement of the prisms, is utilized as the driving part of the range indicating mechanism. The range is indicated by means of revolution counters of the usual type. Three such counters are preferably utilized which are designated 85, 85$^a$ and 85$^b$, the counter 85 being used to indicate ranges from 2,000 to 6666 yds. and the counter 85$^a$ from 6,000 to 20,000 yds., while the counter 85$^b$ will indicate all ranges from 2,000 to 20,000 yds. The counters 85 and 85$^a$ are each provided with pinions 86 and 87, respectively, through which they are actuated, which pinions mesh, respectively, with pinions 88 and 89 carried by a shaft 90, the pinion 88 having three times the number of teeth as the pinion 89, so that the counter 85$^a$ is driven three times as fast as the counter 85. The shaft 90 is driven by two pinions 86$^a$ and 87$^a$, the pinion 86$^a$ being actuated by the shaft 84 which is actuated by the hand-wheel. When, therefore, a base height of less than 50 ft. is being utilized, the counter 85 is the one upon which the reading is made.

As stated, the counter 85$^b$ gives accurate readings for all ranges. Change speed gearing is therefore interposed between this counter and the shaft 90 by which it is driven, the gearing comprising a vertical shaft 95 which is driven from the shaft 90 by means of the beveled pinions 91 and 92. The shaft 95 carries two pinions 97 and 98 which are adapted to mesh respectively with two pinions 99 and 100 carried by a second parallel shaft, the ratio of the gearing being three to one as previously described. The pinions 99 and 100 are loosely mounted upon a shaft 101 which carries a spiral pinion 102 which meshes with a second spiral pinion 103, which actuates the revolution counter 85$^b$. A clutch 104 keyed to the shaft 101 is adapted to be thrown into and out of engagement with either of the pinions 99 and 100 to drive the shaft 101 at a three to one speed as has been described. The clutch 104 is actuated by a sliding rod 106 which passes laterally through the casing 50 and carries at its exterior end a milled head 107 for manual manipulation, the clutch being held in either of its engaged positions or in neutral position by a spring latch 108 engaged in the teeth of the block 109 carried by the rod 106. It will therefore be seen that when the instrument is changed from a maximum range of 6666 yds. to one of 20,000 yds. the milled head 107 should be pushed in after which the revolution counter 85$^b$ will continue to give an accurate reading of the range.

The shaft 101 is also utilized to drive the transmitting switches which electrically transmit impulses to a distant station for indicating the exact range, these transmitting switches being designated 112 and are of the usual type, the circuits which they control being opened and closed by means of eccentric cams 113 mounted on the shaft 101. The device at the distant station which receives these electric impulses may be of any of the well known step-by-step motor type, and forms no part of the present invention.

In order to prevent the too rapid movement of the mechanism of the range finder, a governor 114 is employed which is geared to the shaft 101 and carries a brake disk 115 which is adapted when the speed rises above a predetermined point to be lowered into engagement with a stationary brake surface 116 so as to retard the speed of the parts.

To indicate to the observer operating the range finder, the length of the base height selected, a dial 117 is employed which is actuated by a pinion 118 carried by the manually operable shaft 63 through which the prisms are rotated. The face of the dial 117 is provided with two concentric scales reacting against fixed pointers 117', the outer scale reading from 50 to 150 ft. and the inner scale from zero to 50 ft. The divisions on the two scales are also in a three to one ratio and it should be obvious that since they are connected to the prisms for simultaneous rotation, the angular movement of the scale will be proportional to the angular movement of the prisms. Since the angular positions of the prisms determine their effective refracting power which is proportional to the base height selected, the scale may be integrated to give a direct reading of a base height. In order to determine which scale is being used, a pointer 118 is carried by the clutch operating member and which registers with either of the two marks 119 and the exterior of the casing (see Fig. 1) which will indicate to the observer upon which one of the scales the base height should be read.

If desired, an electric push button 120 may be electrically connected to give a signal at a distant station when the azimuth reading and range finding readings have been determined.

I claim:

1. An instrument comprising two optical systems, one for determining range and the other for determining bearing and means for transmitting direct readings of the range and bearing to a point remote from the instrument.

2. An instrument comprising two optical systems, one for determining range, and the other for determining bearing operating mechanism for the system for determining range having a part whose displacement is directly proportional to the range, operating mechanism for the system for determining bearing having a part whose displacement is directly proportional to the azimuth, and means operatively associated with said parts for giving direct readings of the range and azimuth.

3. An instrument for determining range and bearing comprising two optical systems arranged to bear upon a distant target, mechanism for maintaining both of said systems sighted upon said target and for determining bearing mechanism associated with one of said systems for determining range, said mechanisms each having a part whose displacement is proportional to the bearing and range, respectively, and means operable by said parts for transmitting direct readings of the bearing and range respectively, at a point remote from the instrument.

4. In combination, an optical system for finding range, an optical system for finding bearing, said systems being arranged to simultaneously bear upon a distant target, said optical system for finding range having a part whose displacement is disproportional to the range, range indicating mechanism in said instrument having a part whose displacement is proportional to the range, mechanism operatively associated to each of said parts of the range finder for displacing them the required amounts, bearing indicating mechanism having a part whose displacement is proportional to the bearing, and means operatively associated with the parts whose displacements are proportional to the range and bearing, respectively, for transmitting a direct reading of the range and bearing to a point remote from the instrument.

5. In a range finder, an optical system comprising a refracting prism whose displacement is disproportional to the range, range indicating mechanism having a member whose displacement is proportional to the range, and means coöperatively associated with said part and said member for displacing them the required amounts upon changes in range including speed-changing gearing connected to said member to change the ratio which the displacements of said member bear to the range.

6. In a range finder, an optical system comprising three axially arranged refracting prisms, means for simultaneously rotating two of said prisms in opposite directions and means for separately rotating the other of said prisms.

7. In a range finder, an optical system comprising a set of refracting prisms comprising three axially arranged rotatable prisms, the sum of the refracting powers of two of said prisms being approximately equal to the refracting power of the third.

8. In a range finder, an optical system comprising two sets of refracting prisms each set comprising three axially arranged prisms, means for imparting to two prisms of each set a rotary movement in a direction opposite to each other and opposite to the corresponding prisms of the other set, and means for imparting to the remaining prism of each set rotation in opposite directions.

9. In a range finder, an optical system comprising two sets of refracting prisms each set comprising three axially arranged prisms, the refracting power of two of said prisms being approximately equal to the refracting power of the third, means for imparting to two prisms of each set a rotary movement in a direction opposite to each other and opposite to the corresponding prisms of the other set, and means for imparting to the remaining prism of each set rotation in opposite directions.

10. In a range finder, an optical system for determining range by utilizing a base at a distant point comprising two sets of refracting prisms each set consisting of three axially arranged prisms, means for imparting to two prisms of each set a rotary movement in a direction opposite to each other and opposite to the corresponding prisms of the other set, and means for imparting to the remaining prism of each set rotation of the other prisms, each of said sets of refracting prisms having a linear displacement substantially inversely proportional to the range, range indicating mechanism having a member whose displacement is directly proportional to the range, and means coöperatively associated with said prisms and said member for displacing them the required amounts upon changes in range.

11. In a range finder, an optical system for determining range by utilizing a base at a distant point, comprising two sets of refracting prisms each set comprising at least two axially arranged prisms, means for rotating the prisms of each set in opposite directions, means for linearly displacing said prisms distances which are substantially inversely proportional to the range, range indicating mechanism having a part whose displacement is proportional to the range, and mechanism associated with said mechanism for linearly translating said prisms for displacing said last-named part the required amounts upon changes in range.

12. In a range finder, two axially arranged rotatable prisms, means for rotating the prisms to set the instrument for different base heights, means for linearly moving said prisms, the amount of displacement of said prisms determining the range, a plurality of range-indicating devices associated with said prisms having their range indicating parts displaceable amounts which bear a definite ratio to each other.

13. In a range finder, two axially arranged rotatable prisms, means for rotating the prisms to set the finder for different base heights, means for linearly moving said prisms, the amount of displacement of said prisms determining the range, and a plurality of range-indicating devices associated with said prisms, one of said devices being connected to said prisms to read ranges with short base heights and another of said devices being connected to said prisms to read ranges with long base heights.

In witness whereof, I subscribe my signature.

HANNIBAL C. FORD.